(12) United States Patent
Hirs

(10) Patent No.: US 6,358,406 B1
(45) Date of Patent: Mar. 19, 2002

(54) VACUUM FLUID FILTER

(76) Inventor: Gene Hirs, 3822 W. 13 Mile Rd., Apt. D, Royal Oak, MI (US) 48073

( * ) Notice: Subject to any disclaimer, the term of this patent is extended or adjusted under 35 U.S.C. 154(b) by 0 days.

(21) Appl. No.: 09/658,439

(22) Filed: Sep. 8, 2000

(51) Int. Cl.[7] .................................................. B01D 33/044
(52) U.S. Cl. ........................... 210/90; 210/91; 210/97; 210/103; 210/107; 210/391; 210/401; 210/402; 210/406; 210/411
(58) Field of Search ........................... 210/90, 91, 86, 210/97, 103, 104, 106, 107, 108, 391, 387, 400, 401, 402, 406, 411, 409

(56) References Cited

U.S. PATENT DOCUMENTS

| | | | |
|---|---|---|---|
| 3,091,336 A | * | 5/1963 | Hirs |
| 3,206,030 A | | 9/1965 | Estabrook |
| 3,754,661 A | * | 8/1973 | Palmer et al. |
| 4,008,158 A | * | 2/1977 | Davis |
| 4,276,169 A | * | 6/1981 | Browne et al. |
| 4,661,251 A | * | 4/1987 | Wykoff |
| 5,112,485 A | | 5/1992 | Hirs |

* cited by examiner

*Primary Examiner*—Joseph W. Drodge
*Assistant Examiner*—Terry K. Cecil
(74) *Attorney, Agent, or Firm*—Dinnin & Dunn P.C.

(57) ABSTRACT

A vacuum filter includes a cylindrical filter drum 12 having both a perforate section 14 and an imperforate section 16. The drum is positioned in a tank 20 so that the imperforate section is oriented upwardly therein. A level controller is provided to maintain the level of contaminated fluid below the top of the imperforate section but above the perforate section. A filter belt 54 wrapped around the filter drum is repositioned by rotating the drum when the differential pressure between the interior and exterior of the drum reaches a predetermined value. The inlet ends 35 of the suction pipes 34 are continuously positioned at the lowest point of the drum so that the pump does not lose suction when the drum is rotated thereby facilitating continuous filtration of the contaminated fluid through the vacuum filter.

10 Claims, 4 Drawing Sheets

VACUUM FLUID FILTER

BACKGROUND OF THE INVENTION

Drum filters have extensive applications in filtering washer fluids and coolants for machining operations. Drum filters generally comprise a perforate drum encircled by a permanent media belt. Fluid flows gravitationally from the outside of the drum through the media belt to the inside thereof. The fluid is then discharged from inside the drum by drainage through a central opening to, for example, a fluid holding tank. A drum filter of this type is exemplified by U.S. Pat. No. 5,112,485 to Hirs.

One problem inherent in prior art drum filters heretofore known and used is that gravitational flow limits the filter's ability to draw fluid into the drum when filtering highly pressure-resistant contaminants. Stated another way, prior art drum filters have difficulty operating at pressure differentials between the interior and exterior of the drum greater than gravity.

U.S. Pat. No. 3,206,030 to Estabrook exemplifies a prior art filter that utilizes a pump to provide pressurized fluid flow through the filter media. However, the prior art vacuum drums require that the fluid flow through the filter be stopped when fresh media is advanced onto the filter drum, thereby requiring an interruption in the filtration process when contaminant loading becomes heavy.

SUMMARY OF THE INVENTION

The aforesaid problems are solved, in accordance with a preferred constructed embodiment of the present invention, by a drum filter disposed in a contaminated fluid tank having a tubular shaft for withdrawing filtered fluid connected to a pump to produce a relatively high pressure differential across the filter drum. The pressure differential is enhanced by a novel filter drum having both perforate and imperforate sections. The perforate section is disposed below the level of contaminated fluid in a tank and the imperforate section is adjacent the perforate section at two points on the drum and rises above the level of contaminated fluid. A filter media belt encircles the entire perforate section of the drum to filter contaminated fluid being drawn into the interior of the drum by the suction of the pump. Rotation of the drum to supply fresh media thereto and actuation of a plurality of spray nozzles for cleaning the media belt are controlled by a vacuum switch disposed at a point on the suction side of the drum. A limit switch allows the drum to be rotated a single revolution at a time, so as to always position the imperforate section of the drum upwardly in the tank.

BRIEF DESCRIPTION OF THE DRAWINGS

FIG. 5 is an elevational view, partially in section, of an alternative embodiment of the instant invention.

DETAILED DESCRIPTION OF THE PREFERRED EMBODIMENT(S)

Figure 1:
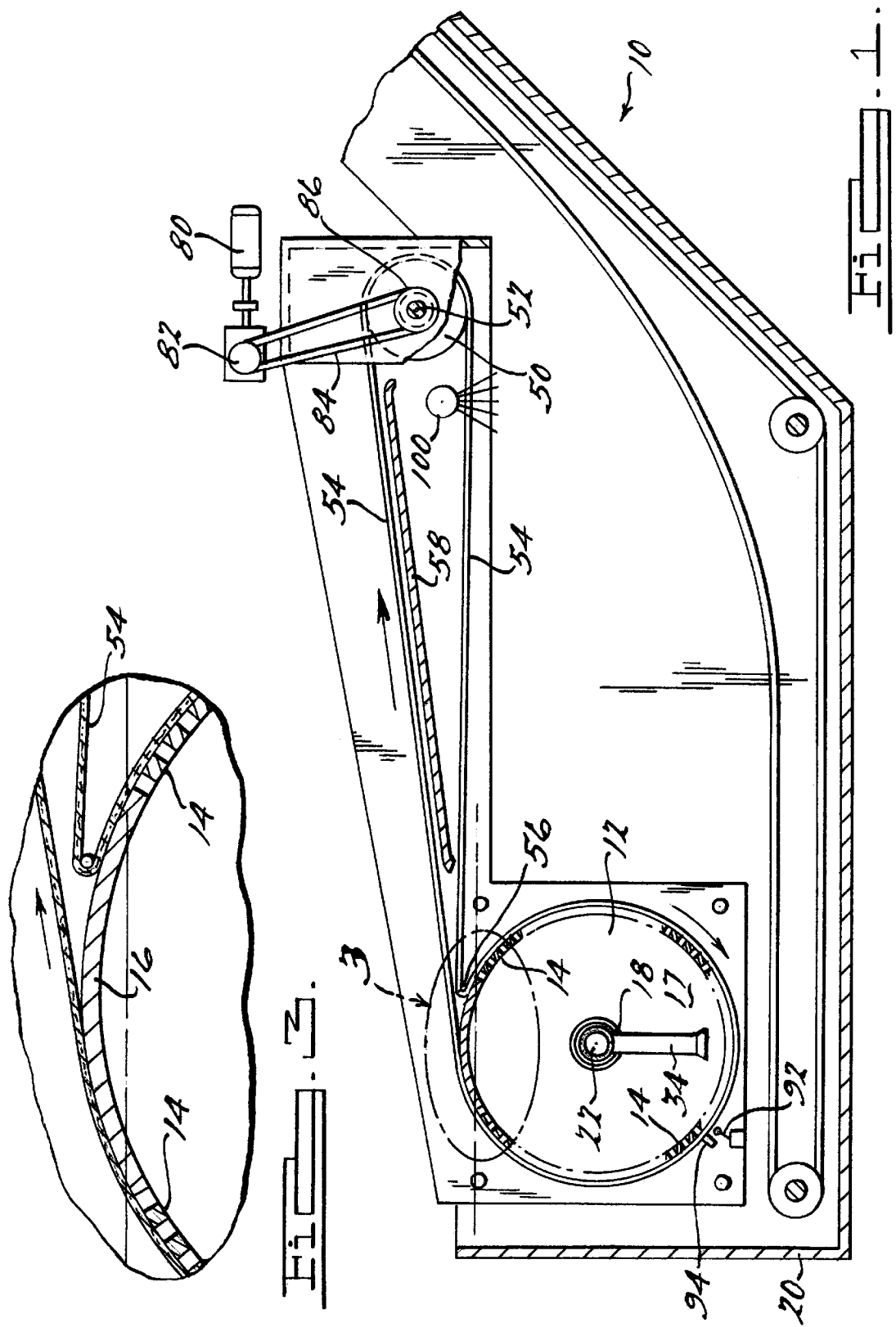
FIG. 1 is an elevational view, partially in section, of a preferred constructed embodiment of the drum filter of the present invention
Figure 2:
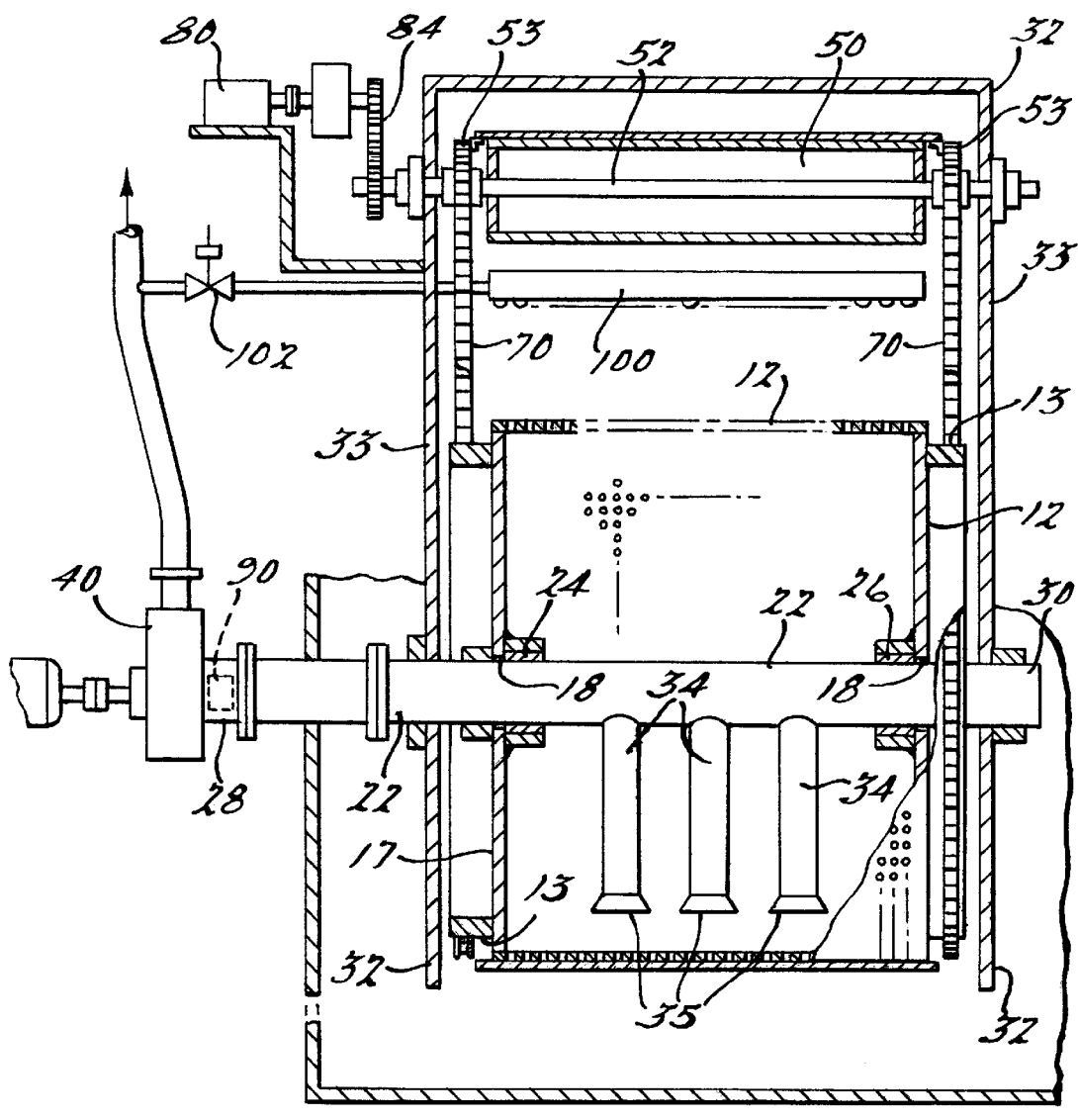
FIG. 2 is a cross-sectional view of the embodiment of FIG. 1.

Referring to FIG. 1 of the drawings, a drum filter 10, in accordance with a preferred constructed embodiment of the instant invention, comprises a right circular cylindrical drum 12 that is disposed internally of a tank 20. The tank 20 contains contaminated liquid supplied from, for example, the wash or cutting fluid used in a manufacturing or machining process. As best seen in FIG. 2, the filter drum 12 has a slightly reduced circumference at either end thereof, forming a pair of opposed cylindrical chain guides 13 for acceptance of a pair of drive chains, as explained hereinbelow. The cylindrical drum 12 is comprised of a perforate section 14 and an imperforate section 16 that is oriented upwardly in normal filter 10 operation. Both the perforate 14 and imperforate 16 sections comprise partial arcuate sections of the cylindrical filter drum 12.

The imperforate section 16 of the drum 12 is an arcuate section of the drum cylinder extending around the drum approximately 120 degrees. The drum 12 further has a pair of spaced imperforate end discs 17, each having a central aperture 18 therein for acceptance of a shaft, as explained hereinbelow.

As best seen in FIG. 2, the filter drum 12 is supported through the end disk apertures 18 on a shaft 22, which is journaled at a plurality of points in bearings 24 and 26 respectively, so as to be freely rotatable under the bias of a filter media upon tensioning thereof, as will be described. Shaft ends 28 and 30 extend through a filter frame 32 and further through the sides of the tank 20. The filter frame 32 comprises a box having vertical walls 33 to provide structural support for the drum filter 10 within the fluid tank 20.

The shaft 22 is of tubular construction and has one end 28 connected to the suction side of a conventional fluid pump 40. Additionally, the tubular shaft 22 has a plurality of suction pipes 34 depending therefrom and in fluid communication with the shaft 22 interior for drawing filtered fluid from the exterior of the filter drum 12 to the interior thereof. The suction pipes 34 in fluid communication with the interior of the tubular shaft 22 each have a fluid inlet 35 proximate the lowest point in the drum 12 to draw the filtered fluid from the exterior to the interior of the filter drum 12 when the fluid level in the tank is low. This feature of the instant invention allows filtration during indexing of the drum 12, as will be explained below.

An idler drum 50 is supported on an idler drum shaft 52 that extends parallel to the filter drum shaft 22 and is journaled for rotation at a plurality of points, for example at opposed vertical sides 33 of the filter frame 32. As best seen in FIG. 1, a permanent, continuous filter media belt 54 is routed around the idler drum 50, thence around an idler roller 56, around the perforate section 14 of the drum 12, up a supporting ramp 58, and thence back to the idler drum 50 in a continuous loop.

The permanent belt 54 may be comprised of many known in the art liquid filtration materials, for example a polymeric monofilament material. In an alternative embodiment of the instant invention a disposable filter media 55 is juxtaposed with the permanent media belt 54 to effect additional fluid filtration. The disposable filter media 55 is removed and replaced at periodic intervals depending upon contaminant loading thereof.

Alternatively, as shown in FIG. 5, a supply roll 51 of disposable filter media 55 may be advanced through an application roller 56, around the perforate section 14 of the drum 12, up a supporting ramp 58, around a return roller 60, thence onto a waste media re-roll drum 62. This permits the use of disposable filter media with the present invention. Both the supply roll 50 and the waste media re-roll drum 62 are journaled for rotation about shafts having central axes substantially parallel to the filter drum shaft 22.

As best seen in FIG. 2, the idler drum shaft 52 has a pair of opposed sprockets 53 journaled thereon at either end. A pair of drive chains 70 are engaged by the sprockets 53 and extend around the filter drum 12 chain guides 13. When the idler drum shaft 52 is rotated, the drum chains 70 rotate the filter drum 12 by frictional contact. The drum chains 70 are secured at a plurality of points to the permanent filter belt 54 via conventional fasteners such as hooks and grommets. The media belt 54 is routed around the filter drum 12 as previously described.

Referring again to FIG. 1, advancement of the filter belt 54 and rotation of the filter drum 12 are accomplished through means of a conventional electric drive motor 80 energized to rotate a drive sprocket 82 that is connected via a chain 84 to a sprocket 86 journaled on the shaft 52 of the idler drum 50. The motor 90 may rotate the drive sprocket 82 through a reducer (not shown) to decrease the speed of rotation, as is well known to one of ordinary skill in the art. In the alternative embodiment of the instant invention wherein a disposable media supply roll 51 is utilized, the disposable filter media 55 is juxtaposed with the permanent filter belt 54 and, once advanced over the drum 12, is thence rerolled on the waste media re-roll drum 62. In this embodiment, the drive motor 80 described above effects the advancement of the media, the rotation of the drum 12, and the rotation of the re-roll drum 62.

Figure 4:
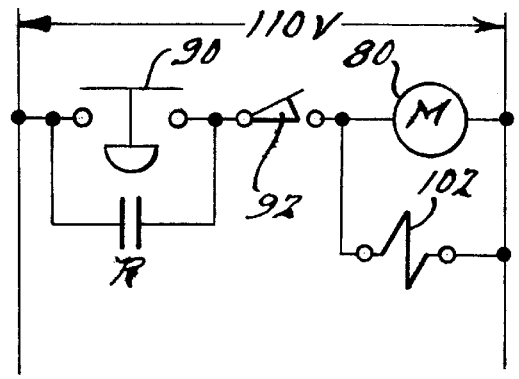
FIG. 4 is an exemplary control circuit schematic in accordance with the present invention.
Figure 3:
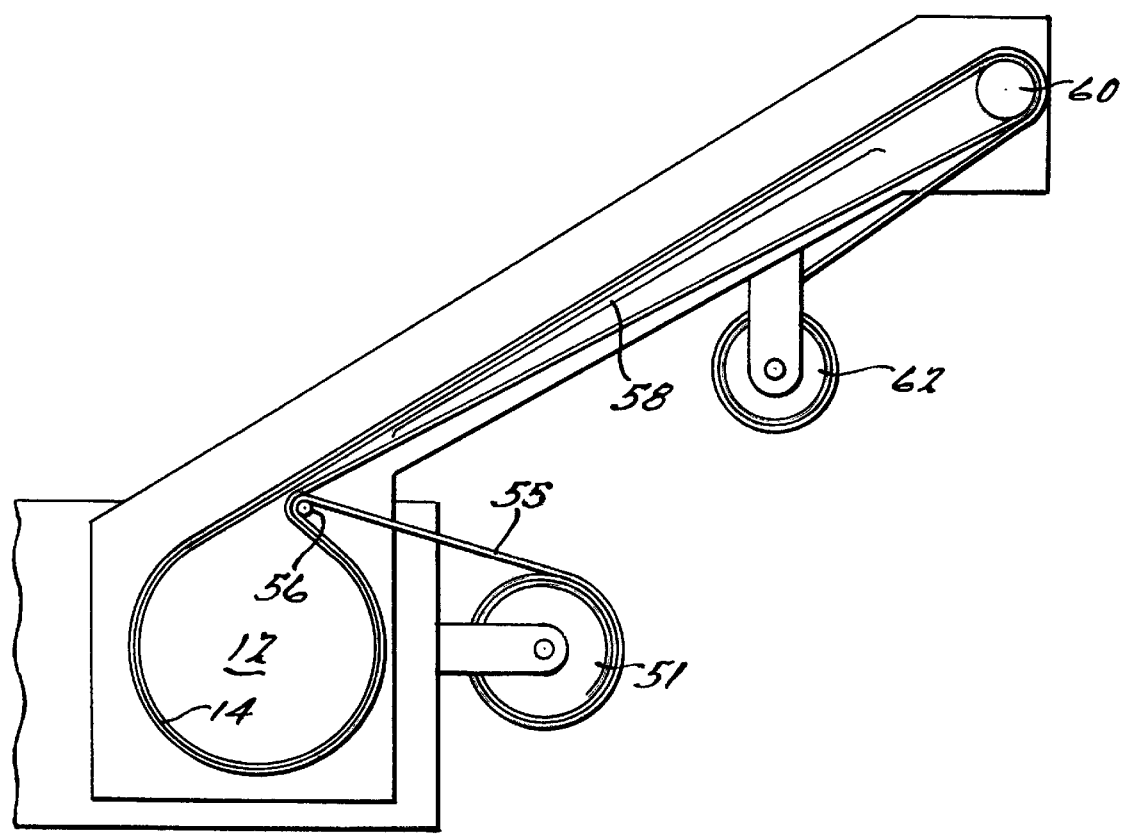
FIG. 3 is an enlarged view taken within the circle 3 of FIG. 1.

Referring now to FIGS. 1, 2 and 4, a conventional vacuum switch 90 is disposed on the tubular shaft 22 to measure vacuum pressure therein. Additionally, a normally closed mechanical limit switch 92 is disposed at a point proximate the filter drum 12 and is deactivated by one complete revolution of the filter drum 12, whereupon the limit switch 92 opens and interrupts a source of electrical power to a relay R, and thence to the electric motor 80. The limit switch is deactivated by displacement by a tab 94 or other equivalent mechanism that is secured to and protrudes from the drum 12. The limit switch 92 may be positioned at any point around the drum where one complete revolution thereof interrupts the switch 92.

When the differential pressure reaches a predetermined setpoint indicative of a high level of contaminant buildup on the filter media, a relay R is energized by the operation of the differential pressure switch. The motor 80 is then energized by operation of the relay R, as shown in the control schematic of FIG. 4. In another alternative embodiment of the instant invention a differential pressure switch 90 may be employed in place of a vacuum switch 90 to detect the difference in pressure between the interior and exterior of the drum 12.

During filter 10 operation, the filter drum 12 remains stationary, having the imperforate section 16 disposed upwardly. The ends of the imperforate section are covered by the contaminated fluid in the tank 20. The level of contaminated fluid in the tank 20 is maintained to be above the uppermost portion of the perforate section 14 of the drum filter 12. The fluid level in the tank 20 may be maintained by any of a variety of known in the art methods. For example, a valve responsive to a float switch (not shown) may be employed to supply contaminated fluid to the tank 20. The float switch is positioned in the tank 20 to de-energize the valve when the fluid level is above the perforate section 14 of the drum 12.

The perforate section 14 of the drum 12 is preferably always below the fluid level in the tank 20, so as to maximize the operating pressure differential between the interior and exterior of the filter drum 12. As contaminants collect on the filter media surface, the fluid pressure in the interior of the filter drum 12 and thus in the interior of the tubular shaft 22 increases as the pump 40 pulls fluid through the filter media. At a predetermined set point determined by the capability of the pump 40 to pull a vacuum, the vacuum switch 90 energizes the drive motor 80, thereby advancing the filter belt 54 and rotating the filter drum 12. At a point where the filter drum has completed one revolution, the limit switch 92 is momentarily deactivated by the tab 94 protruding from the filter drum 12, thereby de-energizing the relay R and motor 80 at the point where the imperforate section 16 of the drum 12 is again positioned upwardly. This upward positioning of the imperforate section 16 of the filter drum 12 allows for greater vacuum to be developed by the pump 40, as the imperforate section 16 of the filter drum seals off the interior of the drum 12 from atmosphere.

Figure 6A:
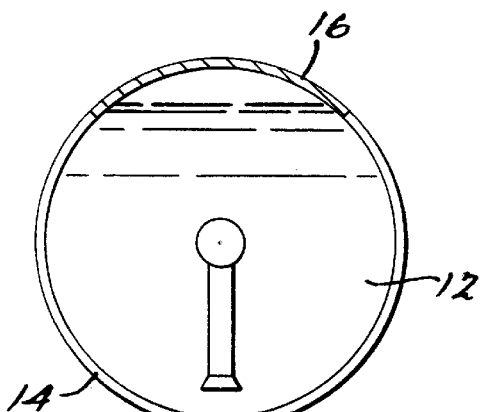
FIGS. 6(a) through (f) are diagrammatic views of the filter drum index cycle in accordance with the instant invention.
Figure 6B:
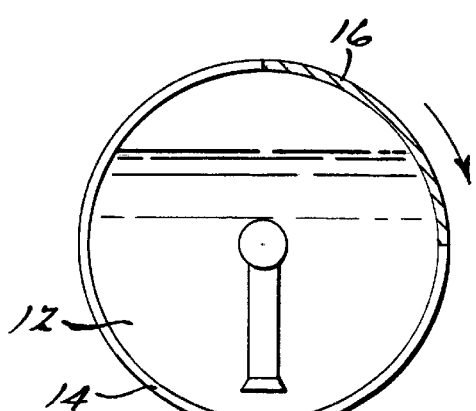
Figure 6C:
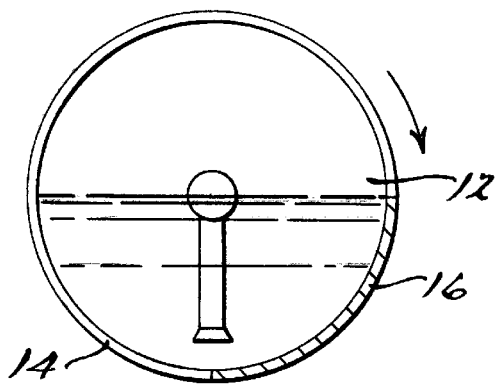
Figure 6D:
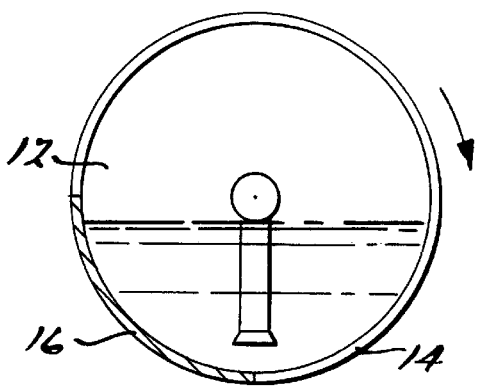
Figure 6E:
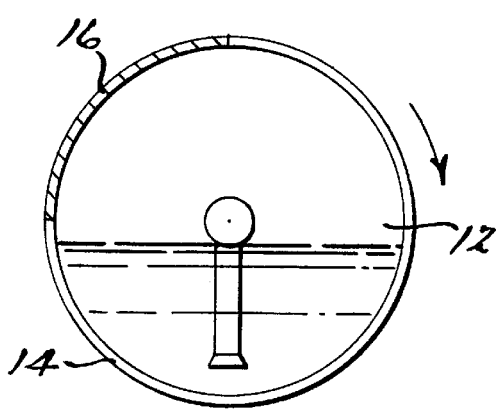
Figure 6F:
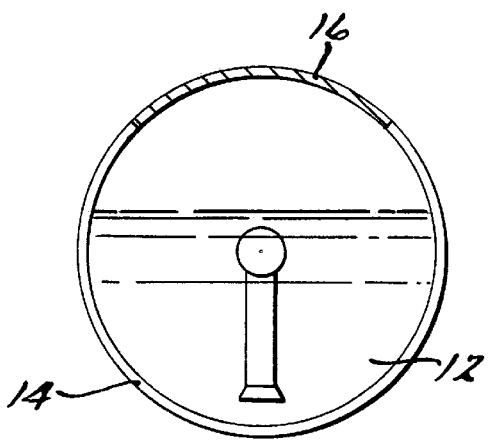

Referring now to FIGS. 6a, b, c, d, e, and f, a complete filter indexing cycle is shown. As the filter belt 54 is indexed, the level of fluid in the drum 12 tends to decrease, as the pump more easily draws fluid through the suction pipes 34 as the perforate section 14 of the drum 12 becomes exposed to atmosphere. Since the suction pipes 34 are positioned at the lowest possible point in the drum 12, the imperforate section of the drum 12 has ample time to index the required 360 degrees without exposing the suction side of the pump 40 to atmosphere. Additionally, since the fluid level drops during indexing, any fluid entering the interior of the drum must pass through the filter belt 54, thereby allowing continuous fluid filtration during indexing of the belt 54 and/or disposable filter media 55. Furthermore, since the pump 40 is still in operation during the drum indexing cycle, the vacuum produced by the pump pulls the filter belt 54 tightly against the drum surface, providing positive contact between the filter belt 54 and drum 12 at all times and thereby enhancing the efficiency of the filter 10.

In another embodiment of the instant invention shown in FIG. 1, a conventional spray nozzle 100, or a plurality thereof, is positioned above the filter belt 54 at a point proximate the idler drum 50 as a means for removing contaminants from the filter belt 54. As the filter belt 54 revolves around the idler drum 50, sludge and sediment caked thereon by operation of the filter drum 12 crack and break off, settling in the bottom of the tank 10. The known-in-the-art spray nozzles are provided to wash any remaining contaminants from the belt 54. The spray nozzles 100 are supplied with pressurized fluid from, for example, the return side of the pump 40 and direct a flow of pressurized liquid against the interior surface of the filter belt 54, whereby any sediment collected thereon is removed. The operation of the spray nozzles 100 is controlled by a wash solenoid 102, energized concomitantly with the drive motor 80, as shown in FIG. 4.

While the preferred embodiments of the invention have been described in detail, it will be appreciated by one of ordinary skill in the art that the instant invention is susceptible of various modifications without departing from the scope of the following claims.

I claim:

1. A vacuum fluid filter for continuously filtering contaminated fluid in a tank comprising:
   a) a right cylindrical filter drum having a perforate section and an imperforate section disposed in said tank and supported for rotation about a central longitudinal axis on a tubular shaft, said tubular shaft journaled at a plurality of points in bearings so as to be freely rotatable or independently rotatable from said filter drum, said imperforate section of said filter drum being positioned upwardly in said tank when said filter drum is stationary;

b) a level controller for controlling the level of contaminated fluid in said tank such that when said filter drum is stationary, the contaminated fluid level is maintained above the perforate section but below the top of the imperforate section of said filter drum;

c) an idler drum supported for rotation about an axis substantially parallel to the axis of said filter drum;

d) a continuous permanent filter belt having a portion thereof wrapped substantially around the periphery of said filter drum and in contact with the imperforate section thereof, and a portion thereof wrapped around said idler drum;

e) a means for withdrawing filtered fluid from an interior of said filter drum comprising a plurality of suction pipes extending downwardly from said tubular shaft, said plurality of suction pipes each having a single inlet end continuously located proximate the lowest point of said filter drum and providing fluid communication between the interior of said filter drum and an interior of said tubular shaft, said vacuum fluid filter configured to maintain the level of filtered fluid in said filter drum above each of said inlet ends to thereby facilitate continuous filtration throughout operation and indexing of said vacuum fluid filter, said tubular shaft only having suction pipes that extend from a bottom side thereof;

f) means for sensing differential pressure between the interior and exterior of said filter drum;

g) means for sensing rotation of said filter drum;

h) means for effecting rotation of said filter drum so as to effect advancement of said filter belt responsive to said means for sensing differential pressure, wherein rotation commences when the differential pressure reaches a predetermined level, said means for effecting rotation further responsive to said means for sensing rotation of said filter drum wherein rotation ceases when said filter drum completes one revolution; and i) means for removing contaminants from said filter belt.

2. A fluid filter as claimed in claim 1 further comprising a disposable filter media juxtaposed with said filter belt for effecting additional filtration of said contaminated fluid.

3. A fluid filter as claimed in claim 1 wherein said means for withdrawing fluid from the interior of said filter drum comprises a pump having a suction side in fluid communication with the interior of said filter drum.

4. A fluid filter as claimed in claim 1, wherein said means for withdrawing fluid from the interior of said filter drum further comprises a pump having a suction side in fluid communication with the interior of said tubular shaft.

5. A fluid filter as claimed in claim 1 wherein the imperforate section of said filter drum extends for a maximum of 120 degrees of the circumference thereof.

6. A fluid filter as claimed in claim 1 wherein said means for sensing differential pressure between the interior and exterior of said filter drum is a vacuum switch.

7. A fluid filter as claimed in claim 1 wherein said means for sensing differential pressure between the interior and exterior of said filter drum is a differential pressure switch.

8. A fluid filter as claimed in claim 1 wherein said means for sensing rotation of said filter drum is a limit switch.

9. A fluid filter as claimed in claim 1 wherein said means for removing contaminants from said filter belt comprises a plurality of spray nozzles positioned proximate said idler drum, said spray nozzles supplied with pressurized fluid directed towards the permanent filter belt to wash contaminants therefrom.

10. A fluid filter as claimed in claim 1 wherein said means for effecting rotation of said filter drum comprises a drive motor for driving a pair of drive chains in frictional contact with said filter drum, the drive chains being secured to said filter belt at a plurality of points.

* * * * *